United States Patent [19]

Kubota et al.

[11] 4,194,977
[45] Mar. 25, 1980

[54] EXPRESSING PLATE FOR USE IN FILTER PRESS

[75] Inventors: Shin-ichi Kubota, Osaka; Masayuki Horimoto, Sakai, both of Japan

[73] Assignee: Kurita Machinery Manufacturing Company Limited, Osaka, Japan

[21] Appl. No.: 31,028

[22] Filed: Apr. 18, 1979

[30] Foreign Application Priority Data

May 17, 1978 [JP] Japan .................................. 53-59415

[51] Int. Cl.² ............................................. B01D 25/12
[52] U.S. Cl. ..................................................... 210/231
[58] Field of Search ................................ 210/227–231; 100/198

[56] References Cited

U.S. PATENT DOCUMENTS

| 3,737,041 | 6/1973 | Kitajima et al. | 210/228 |
| 3,957,645 | 5/1976 | Kurita et al. | 210/231 |
| 3,988,242 | 10/1976 | Kurita | 210/227 |

Primary Examiner—Benoit Castel
Assistant Examiner—E. Rollins Cross
Attorney, Agent, or Firm—Holman & Stern

[57] ABSTRACT

An expressing plate comprises a core plate, a pair of flexible fluid-tight sheets applied to the front and back of the core plate and cylindrically connected together at the central prefilt passage bore of the core plate to define a prefilt passage throughgoing bore, an annular body fitted between the core plate throughgoing bore and cylindrical portion of the sheets, and annular body slipping-off preventing members applied to the front and back of the fitting boundary region between the annular body and the core plate to extend over both the core plate and annular body. The slipping-off preventing members are fixed to at least either the core plate or the annular body.

8 Claims, 8 Drawing Figures

EXPRESSING PLATE FOR USE IN FILTER PRESS

BACKGROUND OF THE INVENTION

The present invention relates to an expressing plate for use in a filter press such as one found in U.S. Pat. No. 3,988,242 comprising a core plate having a throughgoing bore at the center thereof for the passage of prefilt, and a pair of flexible fluid-tight sheets of rubber or the like which are cylindrically connected together at the throughgoing bore to define a prefilt passage bore.

Such expressing plate is of the construction shown in FIG. 1, 2 and 3, Thus, a pair of sheets D are applied to the front and back of the core plate C by wadding one of said sheets and passing it through the prefilt passage throughgoing bore B of the core plate C.

A cylindrical portion E whereby the front and back sheets D are connected together at the throughgoing bore B defines a prefilt passage bore F and is designed to have an opening which is as small as possible so as not to decrease the area of the working surface of the expressing plate A. On the other hand, the throughgoing bore B is as large as possible to facilitate the passage of the sheet D. As a result, a gap is formed between the outer periphery of the culindrical portion E of the sheets D and the inner periphery of the throughgoing bore B. An annular body G is interposed between said cylindrical portion E and said throughgoing bore B to fill said gap so as to stabilize the size of the prefilt passage bore F. The annular body G is also advantageous in that it may be repalced by a smaller or larger size to adjust the size of the prefilt passage bore F according to the kind of the prefilt. However, when the liquid component remaining in the prefilt passage bore F after the completion of filtration and expression is to be extracted by blowing, this blow is directed from one side of the filter press, so that it also acts on the annular body G. The blow pressure is usually about 5 to 30 kg/cm$^2$ but sometimes greater than that. Thus, such high blow pressure from one side often forces the annular body G out of the throughgoing bore B of the core plate C.

Even if an engagement portion H (FIG. 3) of any suitable shape exists between the outer periphery of the annular body G and the inner periphery of the throughgoing bore B, the annular body G is liable to disengage from the throughgoing bore B, projecting out or slipping off, as shown in phantom lines in FIG. 3, since the annular body is radially bisected to facilitate the fitting of the annular body into the throughgoing bore B. Such situation will take place if pressure unbalance is produced for some reason or other in the prefilt chambers J or pressure fluid chambers I when prefilt is fed or when pressure fluid is fed to the pressure fluid chambers I defined between the core plate C and the sheets D.

The projecting out or slipping off of the annular body G entails the abnormal deformation or locally excessive bulging of the sheets D, fatiguing or damaging the latter. If the sheets D have roughened filter surfaces K and have a filter cloth L applied thereto, the filter cloth L can sometimes be damaged. Then, in preparation for the next filtration and expression, the damaged sheets D and filter cloth L have to be individually replaced and the annular body G have to be re-installed.

SUMMARY OF THE INVENTION

A principal object of the present invention is to provide an expressing plate wherein there is no danger of said annular body projecting out of or slipping off the throughgoing bore of the core plate, so that the expressing plate can long and safely be used for filtration and cake compression.

Another object of the invention is to provide a construction which facilitates the manufacture and assembly of parts and the replacement of the annular body.

The main feature of the invention is that slipping-off preventing members are applied to the front and back of the fitting boundary region between the core plate throughgoing bore and the annular body fitted therein to extend over both the core plate and the annular body, said slipping-off preventing members being fixed to at least either the core plate or the annular body. Even if the annular body is subjected to a deviating pressure directed to one side during the filtration and expression process, the possibility of the annular body projecting out of or slipping off the throughgoing bore is prevented in that the slipping-off preventing members are fixed to either the core plate or the annular body and engaged with the other. Accordingly, the cylindrical portion of the pair of flexible fluid-tight sheets applied to the front and back of the core plate by which the sheets are connected together at the core plate throughgoing bore and which is held by said annular body, and the portion around said cylindrical portion will not be subjected to excessive external forces or deformation due to the annular body otherwise projecting out of or slipping off the throughgoing bore and will be protected against the deviating pressure during filtration and expression. When the flexible fluid-tight sheets have filter surfaces and have a filter cloth applied thereto, the filter cloth is likewise protected. Further, the prefilt passage bore defined by the cylindrical portion is also maintained at the predetermined size of opening. With all these features, filtration and expression by the filter press can long and safely be performed. Since the flexible fluid-tight sheets have a prolonged life, the frequency of replacement of sheets is greately reduced, which is advantageous from the standpoint of economy and of the rate of operation of the filter press.

It is desirably that the annular body be divided into two or more parts in a suitable radial direction or directions so as to facilitate the installation of the annular body into the throughgoing bore. If an engagement section for preventing the axial displacement of the annular body is provided between the outer periphery of the annular body and the inner periphery of the core plate throughgoing bore, this is advantageous in that the durability of the slipping-off preventing member is improved and that the use of a plate material or the like for making said members is sufficient for them to perform their intended function, facilitating the manufacture and handling of said members and saving the cost. Further, if the slipping-off preventing members are designed to have a spring function which allows some movement of the annular body within the throughgoing bore to the degree that it will not adversely influencing the flexible fluid-tight sheets, the movement of the annular body within said allowable range will accommodate the deviating pressure acting directly on the flexible fluid-tight sheets so as to protect the flexible fluid-tight sheets against said deviating pressure. To this end, the slipping-off preventing members may desirably be plate springs and the annular body may be divided into parts or fixed in position at some places on the circumference. In that case, the quality of contact of the slipping-off preventing members with the core plate and annular body is improved.

Other objects and features of the invention will be made clear by the following description and the accompanying drawings.

DESCRIPTION OF THE PREFERRED EMBODIMENTS

Figure 1:
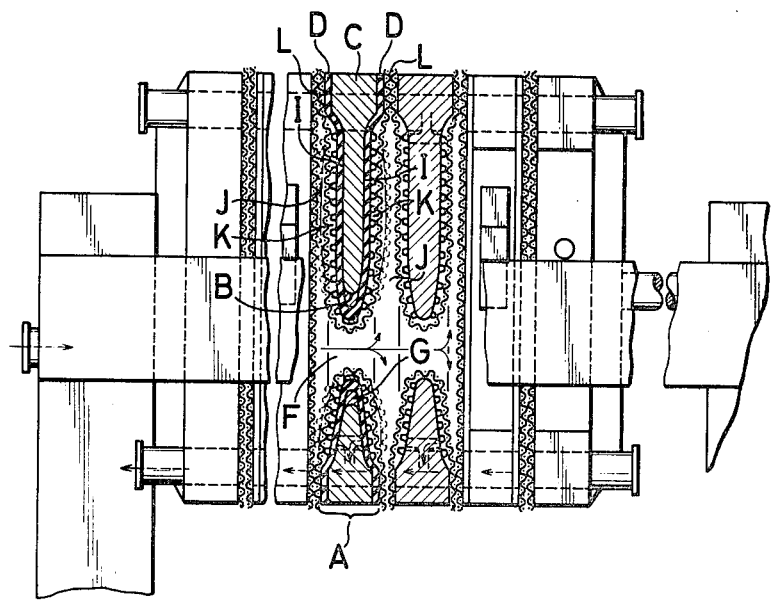
FIG. 1 is a side view, partly in section, of an example of a filter press having conventional expressing plates installed therein.
Figure 2:
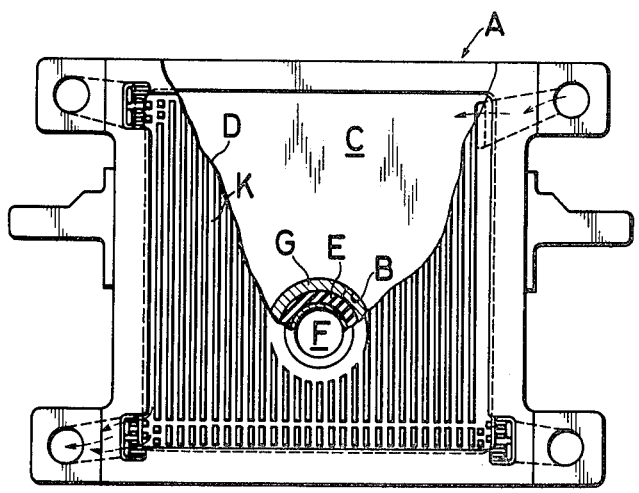
FIG. 2 is a front view of the expressing plate shown in FIG. 1, with a portion of a flexible fluid-tight sheet removed.
Figure 3:
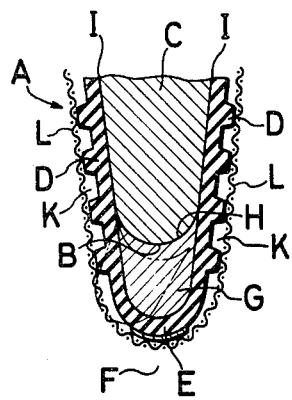
FIG. 3 is an enlarged sectional view of the prefilt passage bore of the expressing plate shown in FIG. 1.
Figure 5:
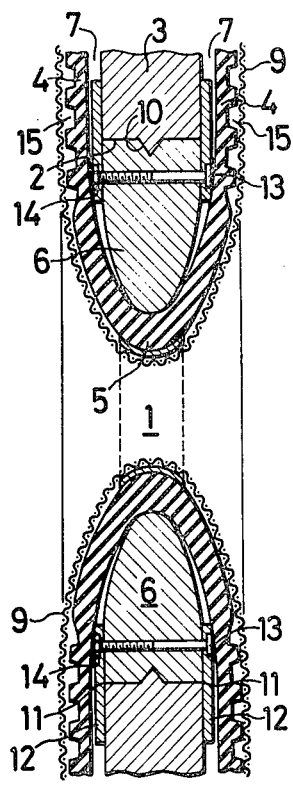
FIG. 5 is an enlarged sectional view taken along the line V—V of FIG. 4.
Figure 4:
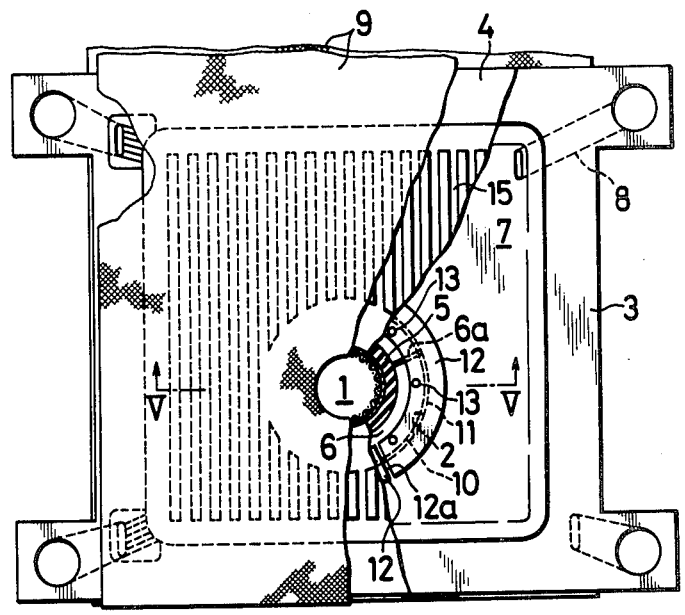
FIG. 4 is a front view of an expressing plate according to the present invention, with portions of the flexible fluid-tight sheets and the filter cloth applied to the filter surface thereof being removed.
Figure 6:
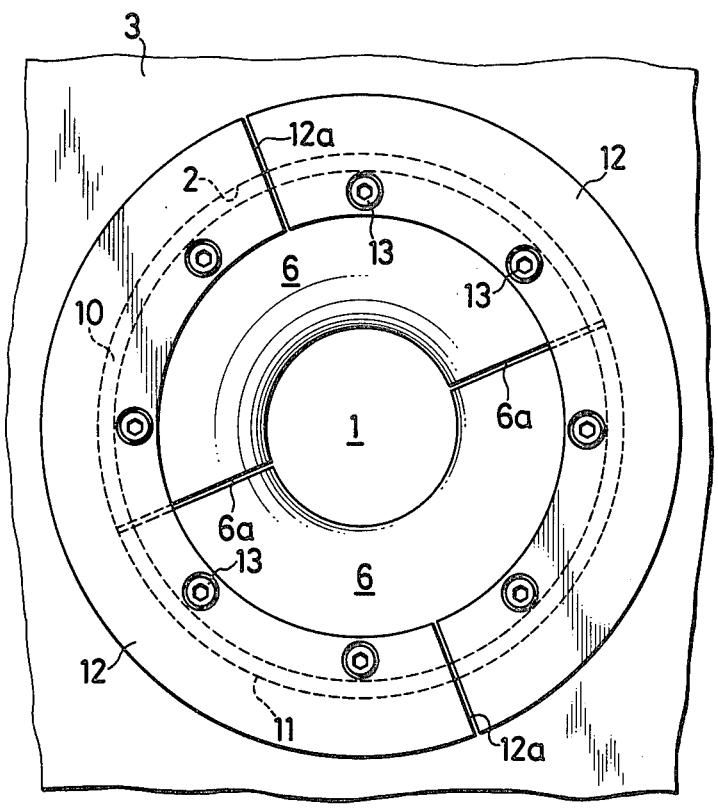
FIG. 6 is a front view of FIG. 5, with the flexible fluid-tight sheets and the filter cloth applied to the filter surface thereof being removed.

Referring to FIGS. 4 through 6 showing an embodiment of the invention, 3 designates a core plate and 4 designates a pair of flexible fluid-tight sheets of rubber or the like applied to the front and back of said core plate 3. The sheets 4 are formed as a unit, connected together by a cylindrical portion 5 at a prefilt passage throughgoing bore 2 formed in the center of the core plate. An annular body 6 is fitted between the throughgoing bore 2 and the cylindrical portion 5, and annular body slipping-off preventing members 12 are applied to the front and back of the fitting boundary region 11 between the annular body 6 and the core plate 3 to extend over the core plate 3 and the annular body 6. The members 12 are fixed to the annular body 6. The annular body 6 is provided with an engagement portion 10 between its outer periphery and the inner periphery of the throughging bore 2 and is radially divided into two parts to facilitate the fitting thereof. The annular body 6 may be axially divided into two parts with the engagement portion 10 as the boundary to facilitate the fitting thereof. In this case, it is desirable to join the split parts together as by bolts. The members 12 are also each radially divided into two parts to improve the quality of contact thereof with the core plate 3 and annular body 6. The end-to-end regions 6a of the annular body 6 and the end-to-end regions 12a of each member 12 are shifted from each other in right angle relation, and the front and back members 12 are joined together by bolts 13 extending through the annular body 6 and nuts 14 threadedly engaged on said bolts. This manner of fixing by using bolts and nuts facilitates the mounting and dismounting of the slipping-off preventing members 12 and annular body 6 and also facilitates the replacement of the annular body 6 in adjusting the size of the prefilt passage bore 1 defined by the cylindrical portion 5. However, the members 12 may be fixed together by rivets or separately fixed to the core plate 3 or annular body 6 by set screws. Thus, the manner of fixing is optional. Adjustments of the size of the prefilt passage bore 1 are made usually by simply substituting an annular body having a different bore size by making use of the elasticity of the cylindrical portion, but drastic adjustments require the change of the sheets 14. The annular body 6 and members 12 are made usually of metal. The annular body 6 is firmly held in fitted relation to the core plate throughgoing bore 2 by the front and back members 12, so that the annular body 6, even if subjected to a deviating pressure directed to one side, will not be displaced even if said engagement portion 10 is not provided. Thus, there is no danger of the annular body slipping off, much less projecting out of, the throughgoing bore 2. Therefore, the right and left pressure fluid chambers 7 between the core plate 3 and the sheets 4 will always have the same shape and size to assure the uniform bulging of the sheets 4 for the uniform compression of cake, without fatiguing or damaging the sheets 4 and the filter cloth 9 applied to the filter surfaces 15 thereof. The numeral 7 designates pressure fluid chambers defined between the sheets 4 and the core plate 3 and 8 designates pressure fluid feed passages to said chambers 7.

The engagement portion 10 serves to prevent the displacement of the annular body 6 and minimize the strength required of the slipping-off preventing members 12. It is sufficient for the members 12 to be formed of thin metal plates, as illustrated, and they are easy to manufacture and handle. The members 12 may advantageously be made springy to allow some movement of the annular body 6 so as to absorb a deviating pressure acting on the sheets 4 and filter cloth 9. This absorption of deviating pressure protects the sheets 4 and filter cloth 9. In the case of making said members 12 springy, the division of the members 12 into parts improves the spring action, and the strength of the spring action can be adjusted by adjusting the number of parts into which they are divided. In some cases, each member 12 may be one-piece or its parts may be discontinuously arranged at a suitable number of places on the circumference. The annular body 6 and the slipping-off preventing members 12 will be variously designed according to the specification of the filter press, the object to be filtered and pressed and other various operating conditions, and besides said metal, other various suitable materials may be used. In the case of a synthetic resin filter plate (3, 4), the members 12 may be made, for exampel, of polypropylene, polyethylene, urethane, polystyrol, or rigid rubber.

Figure 7:
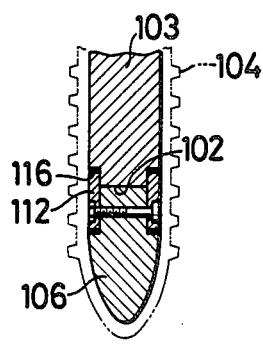
FIG. 7 is a fragmentary sectional view of a portion of an expressing plate, showing a modification of the invention.

In an embodiment shown in FIG. 7, the region of the core plate 102 and annular body 106 fitted in the throughgoing bore 102 thereof to which the slipping-off preventing members 112 are applied is formed with recesses 116 for receiving said members 112. In this embodiment, the edges of the members 112 are prevented from arresting the backs of the flexible fluid-tight sheets 104. In addition, the engagement portion between the annular body and the core plate is omitted.

Figure 8:
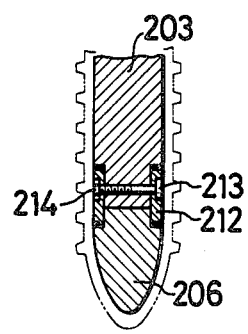
FIG. 8 is a sectional view of a portion of an expressing plate, showing another embodiment of the invention.

In an embodiment shown in FIG. 8, the slipping-off preventing members 212 are fixed to the core plate 203 by bolts 213 and nuts 214, and the function of preventing the projecting out and slipping off of the annular body 206 is the same as in the foregoing embodiments. The rest of the construction is the same as in FIG. 7.

In addition, the slipping-off preventing members may be fixed to both the annular body and the core plate. In that case, the prevention of the projecting out and slipping-off of the annular body is more positive and this arrangement is advantageous when a high deviating pressure is produced.

What is claimed is:

1. An expressing plate for use in a filter press including a core plate with a prefilt passage throughgoing bore formed at the center thereof, and a pair of flexible fluid-tight sheets applied to the front and back of said core plate and connected together by a cylindrical portion extending through said throughgoing bore to define a prefilt passage bore, said expressing plate being characterized by comprising an annular body fitted between the inner periphery of the throughgoing bore and the outer periphery of the cylindrical portion of the pair of flexible fluid-tight sheets, and slipping-off preventing members applied to the front and back of the fitting boundary region between the core plate and the annular body to extend over both the core plate and the annular body, said slipping-off preventing members being fixed to at least either the core plate or the annular body.

2. An expressing plate as set forth in claim 1, wherein said annular body and slipping-off preventing members are made of metal.

3. An expressing plate as set forth in claim 2, wherein each of the slipping-off preventing members is an annular plate which may be one-piece or divided into parts.

4. An expressing plate as set forth in claim 3, wherein said slipping-off preventing members are springy to allow some movement of the annular body within the throughgoing bore.

5. An expressing plate as set forth in claim 1, wherein said slipping-off preventing members are fixed in position by set screws, rivets, or bolts and nuts.

6. An expressing plate as set forth in claim 1, wherein said annular body is provided with an engagement portion disposed between its outer periphery and the inner periphery of the core plate throughgoing bore.

7. An expressing plate as set forth in claim 6, wherein the annular body is divided radially or axially or both.

8. An expressing plate as set forth in claim 1, wherein each of the flexible fluid-tight sheets has an uneven filter surface on its front.

* * * * *